United States Patent Office 2,754,326
Patented July 10, 1956

2,754,326

N-NITROSO-N-ALKYL AMIDES OF AROMATIC DICARBOXYLIC ACIDS

Harris Walton Bradley, Wilmington, Del., and Mack F. Fuller, Woodbury, N. J., assignors to E. I. du Pont de Nemours and Company, Wilmington, Del., a corporation of Delaware No Drawing. Application October 21, 1952, Serial No. 316,076

8 Claims. (Cl. 260—558)

This invention relates to new chemical compounds and methods of preparing the same.

It has been found that the nitrosation reaction is most effectively accomplished when the compound to be nitrosated is in solution. Prior art methods involve the use of organic solvents, such as ether or acetic acid, for dissolving the compound. Most alkyl diamides are poorly soluble in such solvents, however. For this reason, our process makes use of aqueous nitric acid, which is an excellent solvent for these compounds, as the nitrosating medium.

The object of the invention is a preparation of N-nitroso-N-alkyl amides of aromatic dicarboxylic acids. A further object is a method of preparing these new chemical compounds. Other objects will be appreciated from the following description of the invention.

The present invention comprises the preparation of N-nitroso-N-alkyl amides of aromatic dicarboxylic acids. This was accomplished by admixing an N-alkyl amide in nitric acid of strength greater than 20%, and feeding an inorganic nitrite to the solution at $-10°$ to $+30°$ C. to nitrosate the amide. The invention will be more readily understood by considering the following examples:

*Example I*

Fifty grams of N,N'-dimethyl terephthalamide was dissolved in 603 grams of 66% nitric acid at 25 to 30° C. and then cooled to 10° C. A solution of 69 grams of sodium nitrite in 150 grams of water was added over a period of 1.7 hours to the agitated nitric acid/amide solution at 5 to 10° C. The mixture was held at 5 to 10° C. for an additional 15 minutes after the completion of the nitrite addition. The crystalline product, namely, N-N'-dinitroso-N,N'-dimethyl terephthalamide, was filtred and washed free of acid with water. It was characterized by decomposition at 118° C. to 120° C. and showed 22.1% nitrogen on analysis as compared with a calculated nitrogen content of 22.4.

*Example II*

Fifty grams of N,N'-diethyl terephthalamide was dissolved in 603 grams of 66% nitric acid at 25 to 30° C. and then cooled to 10° C. A solution of 69 grams of sodium nitrite in 150 grams of water was added over a period of 1.7 hours to the agitated nitric acid/amide solution at 5 to 10° C. The mixture was held at 5 to 10° C. for an additional 15 minutes after the completion of the nitrite addition. The crystalline product, namely, N,N'-dinitroso-N,N'-diethyl terephthalamide, was filtered and washed free of acid with water. It was characterized by decomposition at 90° C. and showed 19.8% nitrogen on analysis as compared with a calculated nitrogen content of 20.1.

*Example III*

Fifty grams of N,N'-dimethyl isophthalamide was dissolved in 603 grams of 66% nitric acid at 25 to 30° C. and then cooled to 10° C. A solution of 69 grams of sodium nitrite in 150 grams of water was added over a period of 1.7 hours to the agitated nitric acid/amide solution at 5 to 10° C. The mixture was held at 5 to 10° C. for an additional 15 minutes after the completion of the nitrite addition. The crystalline product, namely, N,N'-dinitroso-N,N'-dimethyl isophthalamide, was filtered and washed free of acid with water. It was characterized by decomposition at 108° C. and showed 22.1% nitrogen on analysis as compared with a calculated nitrogen content of 22.4.

*Example IV*

Fifty grams of N,N'-dimethyl terephthalamide was mixed with 750 g. of 41% nitric acid at 8° C. The agitated mixture was adjusted to 10–15° C., and 69 g. of solid sodium nitrite was fed into the mixture at this temperature over a period of 1½ hours. Agitation was continued for 15 minutes after the addition of nitrite was complete. The crystalline product, namely, N,N'-dinitroso-N,N'-dimethyl terephthalamide was filtered and washed free of acid with water. The yellow solid product was dried at room temperature. It melted with effervescence on a hot surface at about 118° C. and showed 22.5% nitrogen on analysis as compared with a calculated nitrogen content of 22.4.

A number of variations may be made in carrying out the process for producing the compounds of the present invention. For instance, the nitrosation process may be carried out at temperatures as high as 45° C.; the preferred range, however, is 5° to 20° C. Temperatures between $-20°$ and $+5°$ C. are operable but not particularly advantageous. The nitric acid strength may be as low as 10%, but the preferred strength is 30% or above.

The only upper limit for the ratio of nitric acid to amide is that dictated by economic considerations. The lower limit is fixed by the quantity of nitric acid which will permit good agitation of the mixture. The minimum ratio of gross nitric acid to amide which is operable is 5.7 to 1.

The nitrite may be added to the nitric acid/amide mixture either in the solid form or as a concentrated solution.

These new chemical compounds have many advantages, being excellent for use as blowing agents to form cellular objects. They may be employed, for instance, for blowing a variety of rubber, resin or plastic compositions. They are especially useful for blowing polyvinyl chloride/plasticizer mixtures, for example. On decomposition, the new nitroso amides produce odorless, colorless, non-toxic products. Cellular products obtained through the use of these amides as blowing agents have much lower densities and are more nearly free of objectionable odors and colors than are those produced through the use of other nitrogen-generating agents previously disclosed in the art.

Since many variations may be made with respect to the process and products of the invention without departing from the scope of the same, it is to be understood that the invention is limited only by the following patent claims.

We claim:

1. An N-nitroso-N-alkyl amide, the said alkyl group of which contains not more than two carbon atoms, of an acid from the group consisting of the metadicarboxylic acid and the paradicarboxylic acid of a carbocyclic aromatic hydrocarbon.

2. N,N'-dinitroso, N,N'-dimethyl terephthalamide.

3. N,N'-dinitroso, N,N'-diethyl terephthalamide.

4. N,N'-dinitroso, N,N'-dimethyl isophthalamide.

5. A process for making an N-nitroso-N-alkyl amide, the said alkyl group of which contains not more than two carbon atoms, of an acid from the group consisting of the metadicarboxylic acid and the paradicarboxylic acid of a carbocyclic aromatic hydrocarbon which comprises dissolving the corresponding N-alkyl amide in nitric acid of strength greater than 20%, and thereafter gradually feeding an inorganic nitrite to the solution at a temperature within the range of from about −10° to about +30° C.

6. The process of claim 5 wherein the N-nitroso-N-alkyl amide is N,N'-dinitroso, N,N'-dimethyl terephthalamide.

7. The process of claim 5 wherein the N-nitroso-N-alkyl amide is N,N'-dinitroso, N,N'-diethyl terephthalamide.

8. The process of claim 5 wherein the N-nitroso-N-alkyl amide is N,N'-dinitroso, N,N'-dimethyl isophthalamide.

References Cited in the file of this patent

UNITED STATES PATENTS

| | | |
|---|---|---|
| 2,491,709 | Briggs et al. | Dec. 20, 1949 |
| 2,555,498 | McKay | June 5, 1951 |
| 2,659,713 | Magat | Nov. 17, 1953 |